(12) United States Patent
Homan

(10) Patent No.: US 7,114,468 B1
(45) Date of Patent: Oct. 3, 2006

(54) INTERNAL SMALL VOLUME STORAGE WATER HEATER

(75) Inventor: Kelly O. Homan, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 11/104,911

(22) Filed: Apr. 13, 2005

(51) Int. Cl.
*F22B 1/28* (2006.01)
(52) U.S. Cl. ...................... 122/4 A; 392/453
(58) Field of Classification Search ............... 122/4 A; 392/451, 453, 455
See application file for complete search history.

(56) References Cited

U.S. PATENT DOCUMENTS

| | | | |
|---|---|---|---|
| 3,987,761 A | 10/1976 | Downs et al. | |
| 4,353,352 A | 10/1982 | Zinn | |
| 4,377,737 A * | 3/1983 | Berry | ............... 392/401 |
| 4,393,663 A | 7/1983 | Grunes et al. | |
| 4,409,958 A * | 10/1983 | Fillios | ............... 122/14.1 |
| 4,421,100 A | 12/1983 | Yu | |
| 4,449,377 A | 5/1984 | Draper | |
| 4,514,617 A * | 4/1985 | Amit | ............... 392/452 |
| 4,564,962 A | 1/1986 | Castleberry et al. | |
| 4,660,510 A * | 4/1987 | Draper | ............... 122/31.1 |
| 4,685,445 A | 8/1987 | Seidel | |
| 5,103,802 A | 4/1992 | Thomason | |
| 5,417,201 A | 5/1995 | Thomas et al. | |
| 5,943,984 A | 8/1999 | Lannes | |

* cited by examiner

*Primary Examiner*—Gregory Wilson
(74) *Attorney, Agent, or Firm*—Greer, Burns & Crain, Ltd

(57) ABSTRACT

The invention concerns devices for water storage, heating and delivery. A storage water heater of the invention provides an amount of unmixed recently heated water from an internal small volume during a draw along with water from a main volume. When water is drawn from the storage water heater, an amount of recently heated water substantially unmixed with the remaining volume of the tank is drawn along with heated water from the remaining volume. Substantial performance increases in the hot water that may be delivered over a period, such as an hour, may be achieved compared to an otherwise identical storage water heater that lacks the invention.

8 Claims, 2 Drawing Sheets

INTERNAL SMALL VOLUME STORAGE WATER HEATER

FIELD OF THE INVENTION

The field of the invention is storage water heaters.

BACKGROUND

Storage water heaters heat a volume of water in an insulated tank. Water is supplied to the tank from a cold water supply while water is drawn from the tank into a hot water pipe, which, for example, may lead to a faucet. Water in the tank is heated by an energy source. An example is an electrical heating element, and another is a flame, such as from a gas combustion source. A sensor controls the energy source.

Increases in the performance of storage water heaters over the years have been achieved by improvements in the tank, or in the efficiency of energy delivery into the volume of water. Insulation values have reached very high levels, and further improvements have been few.

SUMMARY OF THE INVENTION

The invention concerns devices for water storage, heating and delivery. A storage water heater of the invention provides an amount of unmixed recently heated water from an internal small volume during a draw along with water from a main volume. When water is drawn from the storage water heater, an amount of recently heated water substantially unmixed with the remaining volume of the tank is drawn along with heated water from the remaining volume. Substantial performance increases in the hot water that may be delivered over a period, such as an hour, may be achieved compared to an otherwise identical storage water heater that lacks the invention.

DESCRIPTION OF THE EXEMPLARY EMBODIMENTS

Figure 1:
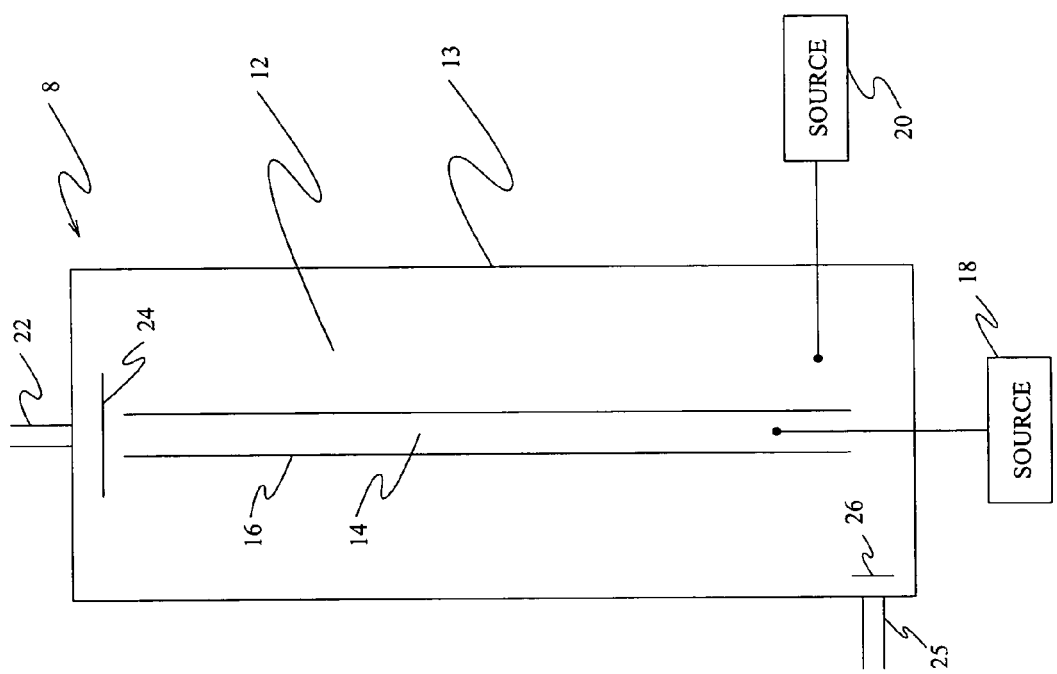
FIG. 1 is a schematic diagram illustrating flow established in an exemplary storage water heater device of the invention.

The invention concerns devices for water storage, heating and delivery. A storage water heater of the invention provides an amount of unmixed recently heated water from a small volume during a draw along with water from a main volume. When water is drawn from the storage water heater, an amount of recently heated water substantially unmixed with the remaining volume of the tank is drawn along with heated water from the remaining volume. Substantial performance increases in the hot water that may be delivered over a period, such as an hour, may be achieved compared to an otherwise identical storage water heater that lacks the invention.

In preferred embodiments of the invention, energy from an energy source is applied to a small volume in a thermosyphon within the storage tank at certain times including a draw, and energy from another energy source is applied to the main volume during other times. Mixing between the small volume(s) and the large main volume is restricted. Water that is heated in the small volume(s) remains at a higher temperature than in the case where an energy source or sources is applied to a single large volume, typically the entire capacity, of a storage water tank. Performance of devices of the invention is also better than devices including multiple heated volumes that are freely mixed and/or lack the controlled draw, heating, and mixing during draw of devices of the invention. When heated water is drawn from a storage water heater of the invention, some water is supplied from the small volume(s) while the energy source in the small volume is active and the balance of water is supplied from that remaining in the main volume.

Preferred embodiments of the invention provide a significant increase in the performance of storage water heater devices, both in terms of short-term discharge characteristics and long-term energy efficiency, through controlled energy addition. The control of the energy addition process is achievable in preferred embodiment devices of the invention through passive structures to assure both manufacturability and reliability. A preferred storage water heater of the invention includes an internal thermosyphon within the main volume an insulated storage tank. Separate energy sources are controlled to separately heat water within the internal thermosyphon and the main volume. During a draw from the water heater, water is taken from the thermosyphon and the main volume while the energy source of the small volume is active and the energy source of the main volume is inactive. A water heater of the invention is able to provide water at a predetermined temperature for a significant time longer than a similar volume tank lacking the internal thermosyphon, heating control, and flow control of the invention. Alternatively, a smaller volume water heater of the invention can provide the performance of significantly larger volume conventional water heater.

Tests of a prototype storage water heater according to an embodiment of the invention, for example, have demonstrated that an electrical resistance heat source internal thermosyphon water heater of the invention provides a First Hour Rating (FHR) typical of a nominal 50 gallon electric resistance water heater from a nominal 40 gallon apparatus of the invention. The present invention could be utilized, therefore, to provide equivalent FHR performance from an apparatus having a smaller storage volume. In a preferred embodiment of the invention, a smaller water storage device is provided that meets or exceeds the hot water output of commercially available devices of larger storage volumes. The increased volumetric output of a device of the invention will permit an overall reduction in the total stored volume, while preserving a specific heated water output. As a result, the external surface of the water heating device may be reduced, which translates into proportionally lower ambient heat losses and increased long-term efficiency as would be reflected, for example, in the Energy Factor (EF).

Prototype testing has also demonstrated that a water heater of the invention will provide a much higher First Draw (FD) than a comparably sized conventional water heater. The First Draw is the output volume equal to or greater than the minimum outlet temperature, as defined in the Department of Energy Test Procedure for Water Heaters, for a single draw, initiated from a fully-charged condition.

Some particular exemplary embodiments of the invention will now be discussed. Some drawings will be presented schematically, and will be understood by artisans. A prototype will be discussed to illustrate a preferred embodiment of the invention.

FIG. 1 is a simplified schematic representation of a storage water device of the invention. Flows and heating will be discussed with respect to FIG. 1. In FIG. 1, a storage water device 8 includes a main volume 12, e.g., an insulated storage tank 13 of a nominal volume. An example nominal volume for a residential storage water tank might range, for example, from 30–70 gallons. A small volume 14 is established within the main volume, for example by a thermosyphon 16. Water within the small volume 14 established by the thermosyphon 16 is directly heated by an energy source 18. Water within the main volume 12 is directly heated by an energy source 20. Heat is applied by the energy source 18 during a draw and a percentage of water drawn is supplied substantially unmixed from the thermosyphon 16 to an outlet 22. When water is drawn from the device 8 a portion of the water is drawn by the outlet 22 from the small volume 14, which is heated during a draw, and the remaining water is drawn from the main volume 12 through an outlet diffuser 24. For best performance, the thermosyphon 16 should be of minimal thermal conductivity. The ratio of water from the small volume 14 and the main volume 12 should be controlled. This can be accomplished by a flow restrictor to control flow through the thermosyphon 16 (as in the FIG. 2 embodiment) or by modulation of relative powers of the energy sources 18 and 20.

In a preferred embodiment, the energy source 18 is controlled to provide heat into the small volume 14 of the thermosyphon 16 during the withdrawal of heated water from the device 8 and during the initial portion of any subsequent charging when there is no draw from the device 8. When passive structures are used, as in the preferred embodiment device 8, flow through the thermosyphon 16 will occur due to temperature differences between water in the small volume 14 and water in the main volume 12, particularly the colder water in the main volume 12. Thus, in the initial stage of a charging process in which there is no flow through the device, relatively colder water is drawn from main volume 12, heated in the small volume 14 by the energy source 18, and returned to the main volume 12 at the top of the thermosyphon 16. The volume of relatively heated water in the upper portion of the main volume 12 is therefore proportional to the energy input rate provided by the energy source 18 and the elapsed time for the charging process. The convective flow through the thermosyphon 16 will slow as the main volume 12 becomes filled with relatively heated water. If the energy source 18 remains activated at a fixed energy input rate, the flow will continue but the temperature of the heated water at the outlet of the thermosyphon 16 may increase to levels exceeding the desired maximum outlet temperature, at least for typical water heating applications. To prevent this, the energy input is preferably switched from the energy source 18 to the energy source 20 before the entire main volume 12 has circulated through the small volume 14 and been heated. The energy source 20 then heats the water in the main volume 12 to a uniform temperature, nominally that of the desired outlet temperature, thereby completing the charging process. While not required, an active structure could be used to modulate the flow resistance and thereby control flow from the thermosyphon 16, as well. During most draw conditions, flow from the thermosyphon while the energy source 18 heats the small volume 14 is desired. In the passive device 8, it is preferable then to have the energy source 20 off during a draw to ensure the maximum flow through the thermosyphon tube 16. However, so long as flow is established out of the thermosyphon 16, the energy source 20 could be active, for example at a lower level.

The energy source 20 provides heating into water within the main volume 12 during the initial portion of a draw from the heater 8, when the main volume has reached a fully-heated state and to maintain and/or to complete the heating of the water in the device 8 during times when no draw is being taken from the device 8. The control of the energy source 20 may be conducted in a conventional fashion, with a conventional thermostat control, when no draw is being taken from the device 8.

The outlet diffuser 24 can be used to cause a withdrawal to bias toward flow from the main volume and to avoid seriously disrupting the flow through the thermosyphon 16 during a draw, while also permitting the energy source 18 to fully heat water in the thermosyphon. An inlet diffuser 26 can also be used to reduce the kinetic energy of the inflow.

A prototype has been constructed and tested. The prototype included features of an additional preferred embodiment, which will now be discussed with respect to FIG. 2. The embodiment shown in FIG. 2 includes a housing 27 enclosing a main storage volume 28. An inlet pipe 29 extends through the housing 27 and into the main volume 28. The inlet pipe is typically connected to a supply 30 of relatively cold water. An outlet pipe 31 also extends through the housing 27 so that it can draw heated water for a hot water supply 32. A usual temperature and pressure relief valve 34 and temperature relief valve drain tube 36 also passes through the housing 27 and is in fluid communication with the main volume 28.

The prototype embodiment used electrical resistance elements for energy sources. An energy source was an electrical resistance heating element 38 extending into a thermosyphon tube 40 that encloses a small volume of water. A plurality of thermostats 44 and/or a controller may be used as will be described, while testing was conducted with a manual control of heating elements in the prototype device. Another electrical resistance heating element 46 provides heat to water in the main volume 28, and may be controlled, during non-draw periods, in like fashion to an energy source in a conventional storage water heater. The heating elements may be controlled by a controller 50 (not used in prototype) or by switching between the elements under direct control of a plurality of thermostats so that when a natural convection flow is started which draws relatively cooler water through the opening at the bottom of the thermosyphon tube 40, the water heats it as it passes over the electrical resistance heat element 38 and leaves the thermosyphon tube 40 through a plurality of holes/slots 52 near the top of the thermosyphon tube 40.

A flow restrictor 54 limits the flow through the thermosyphon tube. The flow restrictor 54 restricts induced flow such that the temperature of the heated water leaving the thermosyphon tube 40 through the openings 52 is approximately that of the desired outlet temperature of the storage water heater. This temperature is typically user adjustable and the Department of Energy Test Procedure for Water Heaters, as an example guideline, specifies that the outlet temperature for a heater fall roughly between 110 and 135 degrees Fahrenheit for a thermostat setting of 135 degrees Fahrenheit. An outlet diffuser 60 controls the level of output of heater water during a draw, which will include an amount of substantially unmixed water from the small internal volume 42.

During draw operation of the preferred embodiment from a standby condition, in which the heated water retained in the main volume 28 satisfies all of the thermostats 44, cold water is admitted into the main volume 28 through the cold water inlet 29. Once the inflow of cold water is sensed by a lower one (the one closest to the input of cold water) of the thermostats 44, the electrical resistance heat element 46 is energized. As the draw of hot water continues, the next highest thermostat will sense the presence of relatively colder water at its level and it will switch on the energy source 38 and switch off the energy source 46. This can be accomplished with a simple switch activated by the thermostats, omitting the controller 50. Alternatively, the controller 50 can be used to control the relative heating levels of the heating elements. The prototype that was constructed and tested used manual switching between the two heating elements to simulate the control of the preferred embodiment. The resistance element 38 remains energized once activated until the draw of water is stopped. In operation of a preferred embodiment, if the draw is stopped after the uppermost thermostat level senses cold water the heating element 38 remains energized until the upper thermostat (the one farthest from the input of cold water) is satisfied. Electrical energy input is then thereafter switched to the heating element 46 until the lowermost thermostat is satisfied. If the draw is stopped before the uppermost of the thermostats 44 senses cold water the electrical input switches to heating element 46 until all thermostats, and particularly the lowermost one, are again satisfied.

The presence or absence of hot water flow through the outlet 31 or of cold water flow through the inlet 30 could be monitored directly by a sensor to reduce the number of thermostats required to provide desirable control. However, multiple thermostats should be more effective to determine a draw condition than a flow sensor implementation.

Figure 2:
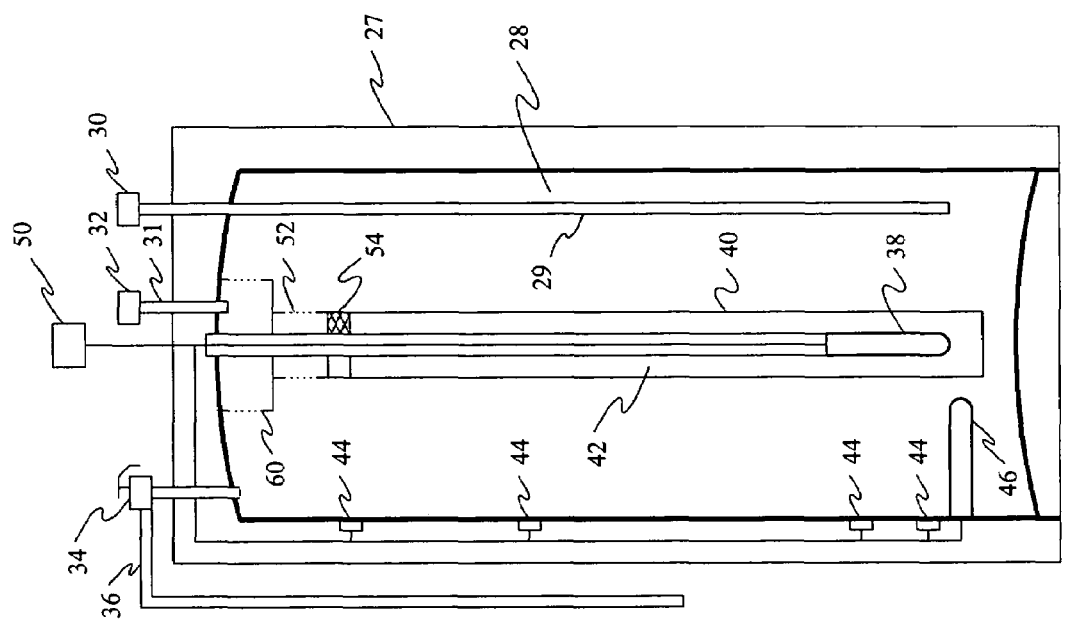
FIG. 2 shows a preferred embodiment electrical resistance storage water heater device of the invention.

Laboratory testing of the FIG. 2 type device with an electrical resistance energy sources was conducted. The test device is referred to as a thermosyphon-based ERWH, hereafter referred to as a TS-ERWH. A commercially-available residential device is referred to as ERWH. The tests showed a significant performance advantage for the thermosyphon-based device of the invention. Results are shown in Table 1.

TABLE 1

Test data for the First Draw (FD) volume fraction in a conventional device (ERWH) and in a thermosyphon-based (TS-ERWH) device.

| Flow rate (gpm) | ERWH | TS-ERWH |
|---|---|---|
| 0.5 | Infinite | infinite |
| 1 | 0.87 | 1.65 |
| 1.5 | 0.87 | 1.35 |
| 2 | 0.86 | 1.24 |
| 2.5 | 0.83 | 1.17 |
| 3 | 0.8 | 1.13 |

The indicated performance metric, First Draw (FD) volume fraction, is defined as the output volume equal to or greater than the minimum outlet temperature divided by the storage volume for a single draw, initiated from a fully-charged condition. One might anticipate that First Draw volume fractions of at least unity would be readily achievable, since energy could be continuously added to the system even during a withdrawal (discharging). However, from the data it is evident that the conventional device does not meet this minimum performance expectation due to the high degree of internal mixing. On the other hand, the thermosyphon-based device exceeds this performance level even at relatively high flow rates. The industry standard measure of short-term performance is the First-Hour Rating (FHR). The FHR measures the volume of hot water which may be withdrawn from a device in one hour at a flow rate of 3.0 gpm. The 40-gallon TS-ERWH device produces an FHR over 64 gallons whereas typical ERWH devices produce FHR values less than 56 gallons.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A storage water heater comprising:
   a main storage volume;
   an insulated tank enclosing said main storage volume;
   a water inlet;
   a water outlet;
   a first energy source for supplying heat into said main storage volume;
   a structure to create a small volume internal to said main storage volume and in fluid communication with said main storage volume; and
   a second energy source for supplying heat into said small volume and controlled to be active during a draw of water through said water outlet.

2. The storage water heater of claim 1, further comprising a restrictor to restrict flow out from said small volume.

3. The storage water heater of claim 1, wherein said first and second energy sources comprise electrical resistance heating elements.

4. A storage water heater comprising:
   a main storage volume;
   an insulated tank enclosing said main storage volume;
   a water inlet;
   a water outlet;
   a first energy source for supplying heat into said main storage volume;
   a structure to create a small volume internal to said main storage volume and in fluid communication with said main storage volume, and
   a second energy source for supplying heat into said small volume and controlled to be active during a draw of water through said water outlet,
   wherein said structure comprises a thermosyphon tube.

5. The storage water heater of claim 3 wherein said thermosyphon tube is arranged to deliver substantially unmixed water to said outlet during a draw while said outlet also draws water from said main storage volume.

6. A storage water heater comprising:
   a main storage volume;
   an insulated tank enclosing said main storage volume;
   a water inlet;
   a water outlet
   a first energy source for supplying heat into said main storage volume;
   a structure to create a small volume internal to said main storage volume and in fluid communication with said main storage volume; and
   a second energy source for supplying heat into said small volume and controlled to be active during a draw of water through said water outlet,
   further comprising a plurality of thermostats, wherein said thermostats control one or both of said first and second electrical heating elements to be active or both to be inactive depending upon the temperature sensed at said plurality of thermostats.

7. A method for heating water in an insulated storage water heater, the method comprising steps of:

creating a main volume of water;

creating a small volume within the main volume, the small volume being in fluid communication to accept water from the main volume and deliver, proximate an outlet, water to said outlet;

supplying heat within the small volume when water is being drawn from the insulated storage water heater; and supplying heat within the main volume to establish and maintain the temperature of water within the main volume.

8. The method of claim 7, further comprising a step of restricting flow from said small volume.

* * * * *

UNITED STATES PATENT AND TRADEMARK OFFICE
CERTIFICATE OF CORRECTION

PATENT NO.        : 7,114,468 B1
APPLICATION NO. : 11/104911
DATED             : October 3, 2006
INVENTOR(S)       : Kelly O. Homan It is certified that error appears in the above-identified patent and that said Letters Patent is hereby corrected as shown below:

Column 6, line 48, please delete "claim 3" and insert --claim 4-- therefor.

Signed and Sealed this

Twenty-sixth Day of June, 2007

JON W. DUDAS
*Director of the United States Patent and Trademark Office*